United States Patent
He

(10) Patent No.: US 10,069,556 B2
(45) Date of Patent: Sep. 4, 2018

(54) SIGNAL PROCESSING METHOD AND BASE STATION

(71) Applicant: Huawei Technologies Co., Ltd., Shenzhen, Guangdong (CN)

(72) Inventor: Longke He, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 149 days.

(21) Appl. No.: 15/178,035

(22) Filed: Jun. 9, 2016

(65) Prior Publication Data

US 2016/0294463 A1 Oct. 6, 2016

Related U.S. Application Data

(63) Continuation of application No. PCT/CN2013/088888, filed on Dec. 9, 2013.

(51) Int. Cl.
| | |
|---|---|
| *H04W 4/00* | (2018.01) |
| *H04B 7/08* | (2006.01) |
| *H04W 16/28* | (2009.01) |
| *H04B 7/06* | (2006.01) |
| *H04W 16/02* | (2009.01) |
| *H04W 72/04* | (2009.01) |

(52) U.S. Cl.
CPC .......... *H04B 7/086* (2013.01); *H04B 7/0691* (2013.01); *H04B 7/0697* (2013.01); *H04W 16/02* (2013.01); *H04W 16/28* (2013.01); *H04W 72/044* (2013.01); *H04W 72/0413* (2013.01); *Y02D 70/00* (2018.01); *Y02D 70/1222* (2018.01); *Y02D 70/1242* (2018.01); *Y02D 70/1262* (2018.01); *Y02D 70/146* (2018.01); *Y02D 70/444* (2018.01)

(58) Field of Classification Search
CPC ...................................... H04B 7/086
USPC .......................................... 370/330
See application file for complete search history.

(56) References Cited

U.S. PATENT DOCUMENTS

| | | | |
|---|---|---|---|
| 6,314,305 B1 | 11/2001 | Solondz et al. | |
| 8,855,718 B2 | 10/2014 | Cai et al. | |
| 2011/0085491 A1 | 4/2011 | Tynderfeldt et al. | |
| 2013/0114753 A1* | 5/2013 | Sahara | H04B 7/0865 375/267 |

(Continued)

FOREIGN PATENT DOCUMENTS

| | | |
|---|---|---|
| CN | 1738470 A | 2/2006 |
| CN | 1968487 A | 5/2007 |

(Continued)

*Primary Examiner* — Derrick Ferris
*Assistant Examiner* — Abdeltif Ajid

(57) ABSTRACT

The embodiments of the present invention relates to a signal processing method and a base station. The method includes: splitting, by a base station, an array antenna to form a first transmit beam and a second transmit beam in a downlink direction, where the first transmit beam covers a first cell and the second transmit beam covers a second cell; performing, by the base station, weighting on the array antenna in an uplink direction to form a receive beam; and transmitting, by the base station, a downlink signal to first user equipment UE by using the first transmit beam, and performing uplink signal transmission with the first UE by using the receive beam, where the first UE is located in the first cell.

10 Claims, 3 Drawing Sheets

(56) References Cited

U.S. PATENT DOCUMENTS

2014/0241291 A1    8/2014  Moulsley et al.
2017/0353985 A1*  12/2017  Seo ..................... H04L 5/0053

FOREIGN PATENT DOCUMENTS

| CN | 101472287 A | 7/2009 | |
|----|----|----|----|
| CN | 101908915 A | 12/2010 | |
| EP | 0755090 A1 | 1/1997 | |
| EP | 1729531 A1 | 12/2006 | |
| EP | 1919233 A2 | 5/2008 | |
| EP | 2587687 A1 * | 1/2013 | .............. H04B 7/06 |
| JP | 2002314470 A | 10/2002 | |
| JP | 2005143148 A | 6/2005 | |
| JP | 2013507030 A | 2/2013 | |
| JP | 2013507823 A | 3/2013 | |
| WO | WO 2011150764 A1 * | 12/2011 | .............. H04B 7/06 |
| WO | 2013022161 A1 | 2/2013 | |

\* cited by examiner

SIGNAL PROCESSING METHOD AND BASE STATION

CROSS-REFERENCE TO RELATED APPLICATIONS

This application is a continuation of International Patent Application No. PCT/CN2013/088888, filed on Dec. 9, 2013, which is hereby incorporated by reference in its entirety.

TECHNICAL FIELD

The embodiments of the present invention relates to the field of communications technologies, and in particular, to a signal processing method and a base station.

BACKGROUND

With development of intelligent terminals and mobile Internet, higher requirements on capacities of wireless networks are proposed. A data service characteristic of mobile broadband is asymmetrical uplink and downlink data traffic, and downlink data traffic is far greater than uplink data traffic. In this case, in a system with symmetric broadband, downlink load is far greater than uplink load. Therefore, requirements of the mobile broadband development on the capacities are mainly requirements on downlink capacities.

A traditional capacity expansion solution includes adding a system carrier and adding a site. However, an operator has to face limited wireless spectrum resource, a difficulty in site acquisition, and high costs of establishing a new site. A sector splitting (cell splitting) technology splits an original sector having a relatively high capacity requirement into multiple sectors, which provides a low-cost capacity expansion solution without adding a site or adding a system carrier.

Traditional cell splitting uses a manner in which uplink splitting and downlink splitting are performed simultaneously; consequently, there may be a problem that a difference between uplink coverage and downlink coverage increases.

SUMMARY

The embodiments of the present invention provides a signal processing method and a base station, which can significantly increase uplink coverage while a downlink capacity is considered.

A first aspect of the embodiments of the present invention provides a signal processing method, where the method includes:

splitting, by a base station, an array antenna to form a first transmit beam and a second transmit beam in a downlink direction, where the first transmit beam covers a first cell and the second transmit beam covers a second cell;

performing, by the base station, weighting on the array antenna in an uplink direction to form a receive beam; and transmitting, by the base station, a downlink signal to first user equipment UE by using the first transmit beam, and performing uplink signal transmission with the first UE by using the receive beam, where the first UE is located in the first cell.

With reference to the first aspect, in a first possible implementation manner of the first aspect, the performing, by the base station, weighting on the array antenna to form a receive beam specifically includes:

performing wide beamforming on the array antenna to form the receive beam; or selecting some antenna arrays from the array antenna to form the receive beam.

With reference to the first aspect, in a second possible implementation manner of the first aspect, the performing uplink signal transmission with the first UE by using the receive beam includes:

allocating a first time-frequency resource of the uplink signal to the first UE, where the first time-frequency resource and a second time-frequency resource of an uplink signal of second UE are staggered, where the second UE is located in the second cell; and performing uplink signal transmission with the first UE by using the first time-frequency resource and by using the receive beam.

With reference to the first aspect, in a third possible implementation manner of the first aspect, the allocating a first time-frequency resource of the uplink signal to the first UE, where the first time-frequency resource and a second time-frequency resource of an uplink signal of second UE are staggered specifically includes:

acquiring the second time-frequency resource that is used by the second UE in the second cell to transmit the uplink signal; and reserving the second time-frequency resource in a time-frequency resource that is used to transmit an uplink signal in the first cell.

With reference to the first aspect or any one of the first to third possible implementation manners of the first aspect, in a fourth possible implementation manner of the first aspect, the uplink signal includes anyone or any combination of the following: an uplink control signal, an uplink data service, an uplink channel sounding signal, or a random access signal.

According to a second aspect, the embodiments of the present invention further provides a base station, where the base station includes: a first processing unit, a second processing unit, and a transceiver unit, where the first processing unit is configured to split an array antenna to form a first transmit beam and a second transmit beam in a downlink direction, where the first transmit beam covers a first cell and the second transmit beam covers a second cell;

the second processing unit is configured to perform weighting on the array antenna in an uplink direction to form a receive beam; and the transceiver unit is configured to transmit a downlink signal to first user equipment UE by using the first transmit beam, and perform uplink signal transmission with the first UE by using the receive beam, where the first UE is located in the first cell.

With reference to the second aspect, in a first possible implementation manner of the second aspect, the second processing unit being configured to perform weighting on the array antenna to form a receive beam specifically includes:

being configured to perform wide beamforming on the array antenna to form the receive beam; or being configured to select some antenna arrays from the array antenna to form the receive beam.

With reference to the second aspect, in a second possible implementation manner of the second aspect, the base station further includes:

a third processing unit, configured to allocate a first time-frequency resource of the uplink signal to the first UE, where the first time-frequency resource and a second time-frequency resource of an uplink signal of second UE are staggered, where the second UE is located in the second cell, where the transceiver unit being configured to transmit a downlink signal to first user equipment UE by using the first transmit beam, and perform uplink signal transmission with the first UE by using the receive beam includes:

the transceiver unit being configured to transmit the downlink signal to the first user equipment UE by using the first transmit beam, and being configured to perform uplink signal transmission with the first UE by using the first time-frequency resource and by using the receive beam.

With reference to the second aspect, in a third possible implementation manner of the second aspect, the third processing unit is specifically configured to acquire the second time-frequency resource that is used by the second UE in the second cell to transmit the uplink signal; and is configured to reserve the second time-frequency resource in a time-frequency resource that is used to transmit an uplink signal in the first cell.

With reference to the second aspect or any one of the first to third possible implementation manners of the second aspect, in a fourth possible implementation manner of the second aspect, the uplink signal includes any one or any combination of the following: an uplink control signal, an uplink data service, an uplink channel sounding signal, or a random access signal.

According to a third aspect, the embodiments of the present invention further provides a base station, where the base station includes: a processor, a transceiver, and a memory, where the transceiver is configured to interact with user equipment;

the memory is configured to store a program; and the processor is configured to invoke the program stored in the memory, to perform the following steps:

splitting an array antenna to form a first transmit beam and a second transmit beam in a downlink direction, where the first transmit beam covers a first cell and the second transmit beam covers a second cell;

performing weighting on the array antenna in an uplink direction to form a receive beam; and transmitting a downlink signal to first user equipment UE by using the first transmit beam, and performing uplink signal transmission with the first UE by using the receive beam, where the first UE is located in the first cell.

With reference to the third aspect, in a first possible implementation manner of the third aspect, the processor being configured to perform weighting on the array antenna to form a receive beam specifically includes:

the processor being configured to:

perform wide beamforming on the array antenna to form the receive beam; or select some antenna arrays from the array antenna to form the receive beam.

With reference to the third aspect, in a second possible implementation manner of the third aspect, the processor being configured to perform uplink signal transmission with the first UE by using the receive beam specifically includes:

the processor being configured to:

allocate a first time-frequency resource of the uplink signal to the first UE, where the first time-frequency resource and a second time-frequency resource of an uplink signal of second UE are staggered, where the second UE is located in the second cell; and perform uplink signal transmission with the first UE by using the first time-frequency resource and by using the receive beam.

With reference to the third aspect, in a third possible implementation manner of the third aspect, the processor being configured to allocate a first time-frequency resource of the uplink signal to the first UE, where the first time-frequency resource and a second time-frequency resource of an uplink signal of second UE are staggered specifically includes:

the processor being configured to:

acquire the second time-frequency resource that is used by the second UE in the second cell to transmit the uplink signal; and reserve the second time-frequency resource in a time-frequency resource that is used to transmit an uplink signal in the first cell.

With reference to the third aspect or any one of the first to third possible implementation manners of the third aspect, in a fourth possible implementation manner of the third aspect, the uplink signal includes any one or any combination of the following: an uplink control signal, an uplink data service, an uplink channel sounding signal, or a random access signal.

In the signal processing method and the base station provided in the embodiments of the present invention, a manner that downlink splitting is performed and uplink splitting is not performed is used, thereby resolving a downlink capacity requirement and an uplink coverage requirement, reducing interference between cells, improving user service experience, and reducing terminal power consumption.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the invention objectives, features, and advantages of the embodiments of the present invention clearer and more comprehensible, the following describes the technical solutions in the embodiments of the present invention with reference to the accompanying drawings in the embodiments of the present invention. Apparently, the embodiments described in the following are merely some but not all of the embodiments of the present invention. All other embodiments obtained by a person of ordinary skill in the art based on the embodiments of the present invention without creative efforts shall fall within the protection scope of the present invention.

A signal processing method and a base station provided in the embodiments of the present invention may be applied to a Long Term Evolution (LTE) system, or may be applied to a communications system such as a Global System for Mobile Communications (GSM), a Universal Mobile Telecommunications System (UMTS), or a Worldwide Interoperability for Microwave Access (WiMAX). For ease of description, the embodiments of the present invention are described by using the LTE system as an example.

The embodiments of the present invention are described by using an example in which an array antenna is split into two beams in a downlink direction, and for a case in which there are multiple downlink beams, similar extensions may be performed based on this, which are not enumerated in the present invention.

Traditional cell splitting uses a manner in which uplink splitting and downlink splitting are performed simultaneously.

For a case in which an inter-site distance is relatively small, after uplink splitting and downlink splitting are performed simultaneously in a cell, interference to a cell edge user increases, resulting in a decreased signal to interference plus noise ratio of the user. Because more resources may be allocated to a downlink user, a downlink throughput increases. However, for an uplink direction, because transmit power of user equipment is limited and no more resources can be used, an uplink throughput decreases, and a handover success rate may also be affected, thereby causing poor network performance and poor user experience.

For a case in which an inter-site distance is relatively large, after uplink splitting and downlink splitting are performed simultaneously in a cell, although antenna gains may be acquired in both an uplink direction and a downlink direction and coverage is improved, there may also be interference between two split beams. For a case in which the cell splitting is not used, uplink coverage is smaller than downlink coverage. Therefore, especially in the case in which an inter-site distance is relatively small, simultaneous uplink splitting and downlink splitting do not satisfy a requirement of increasing the uplink coverage, and a difference between the uplink coverage and the downlink coverage increases.

Embodiment 1

Figure 1:
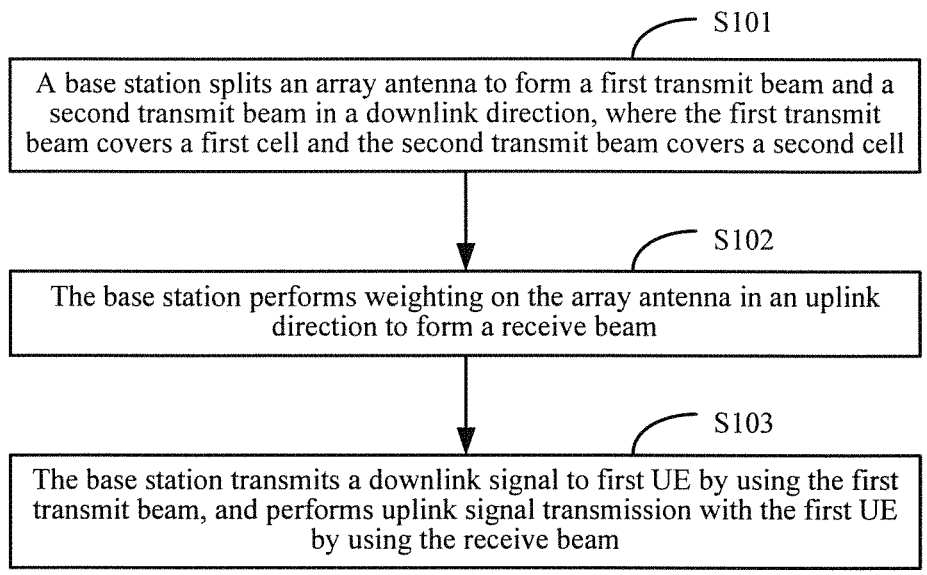
FIG. 1 is a flowchart of a signal processing method according to Embodiment 1 of the present invention.

As shown in FIG. 1, a signal processing method provided in Embodiment 1 of the present invention includes:

S101: A base station splits an array antenna to form a first transmit beam and a second transmit beam in a downlink direction, where the first transmit beam covers a first cell and the second transmit beam covers a second cell.

The base station may perform vertical plane splitting or horizontal plane splitting on the array antenna, which is not limited in this embodiment of the present invention.

Figure 2A:
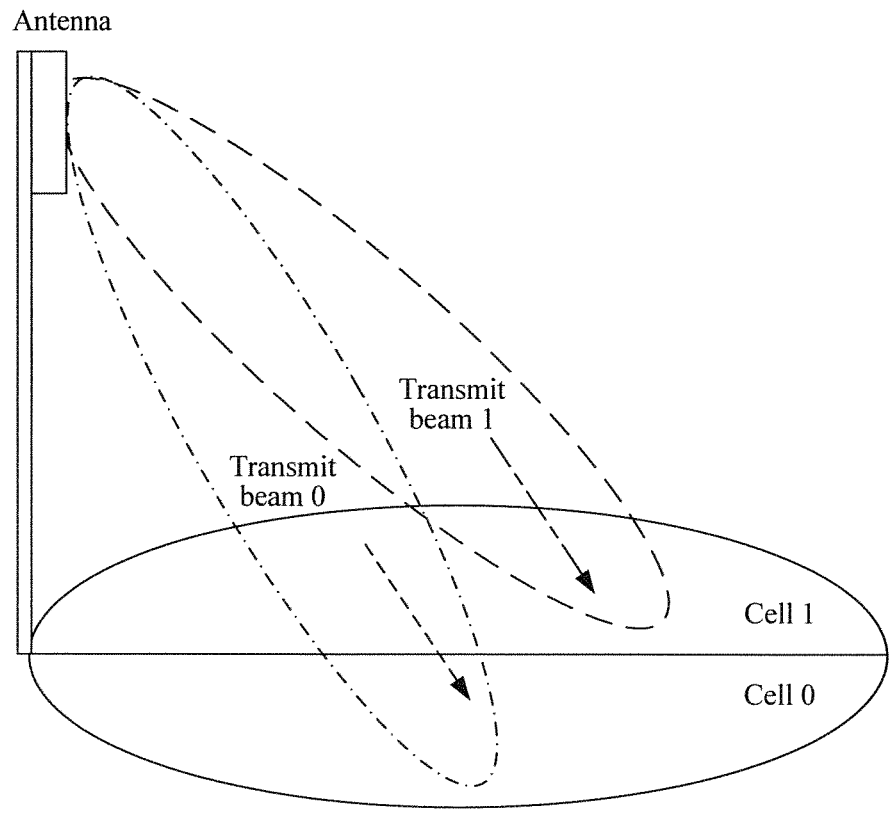
FIG. 2a is a schematic diagram showing that a base station splits an array antenna in a downlink direction according to Embodiment 1 of the present invention.

As shown in FIG. 2a, the base station splits the array antenna to form two transmit beams in the downlink direction: a transmit beam 0 and a transmit beam 1, where the transmit beam 0 covers a cell 0 and the transmit beam 1 covers a cell 1. Information, such as service channel information, control channel information, broadcast channel information, or synchronization channel information, of each cell may be separately transmitted by using each split transmit beam.

S102: The base station performs weighting on the array antenna in an uplink direction to form a receive beam.

Figure 2B:
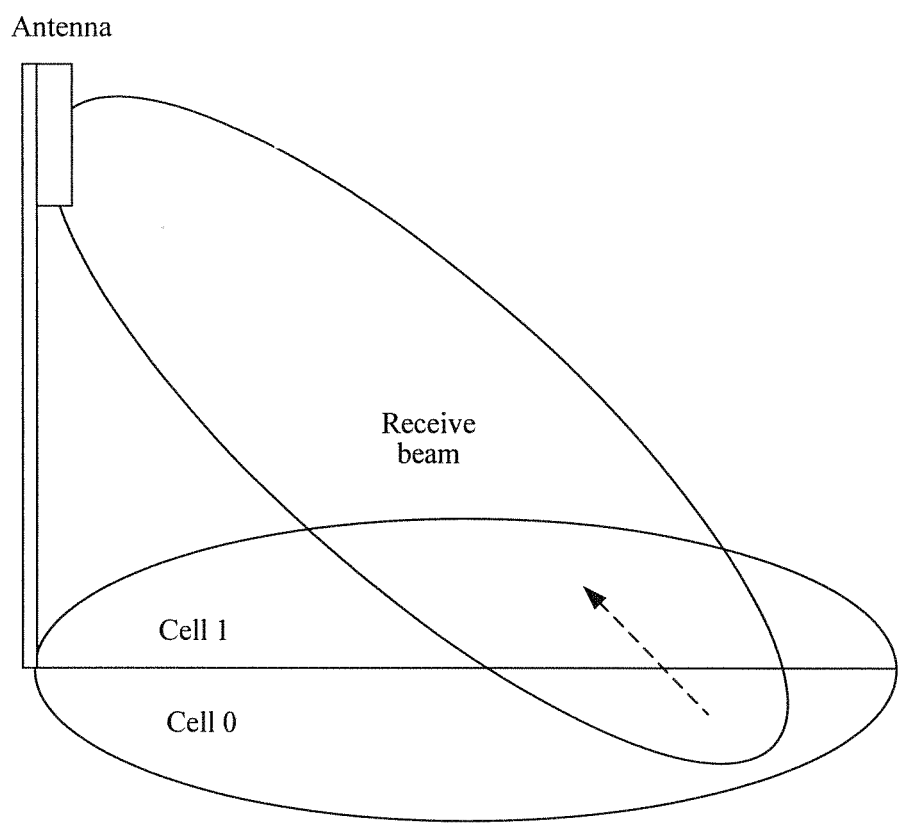
FIG. 2b is a schematic diagram showing that a base station performs signal transmission in an uplink direction by using a common receive beam according to Embodiment 1 of the present invention.

Compared with the prior art that uplink splitting and downlink splitting are performed simultaneously on an array antenna, in this embodiment of the present invention, the array antenna is not split in the uplink direction, but weighting is performed on the array antenna to form the receive beam. That is, for different cells generated by the downlink splitting, a common receive beam is used to perform signal transmission in the uplink direction, as shown in FIG. 2b.

The performing, by the base station, weighting on the array antenna to form a receive beam specifically includes: performing wide beamforming on the array antenna to form the receive beam; or selecting some antenna arrays from the array antenna to form the receive beam.

For example, transmission is performed with 8T in an array antenna, in a downlink direction, a transmit beam may be obtained by multiplying four columns of antennas in each polarization direction by a corresponding weighted value, so that two transmit beams may be formed by using two different weighted values, where each transmit beam corresponds to one cell.

In an uplink direction, if signal receiving is performed with 4R, wide beamforming may be performed on the array antenna, that is, eight physical antennas of the array antenna are mapped into four antenna ports, and at the same time, a beamwidth of the antenna is changed from around 90 degrees to around 65 degrees, so that the beamwidth is the same as a beamwidth of a traditional 4-antenna beam.

In addition to performing weighting on the array antenna by means of wide beamforming, some antenna arrays may be selected from the array antenna. For example, four antenna arrays may be selected from antenna arrays of the array antenna to perform uplink signal receiving with 4R; and two antenna arrays may be selected if uplink signal receiving is performed with 2R.

S103: The base station transmits a downlink signal to first user equipment (UE) by using the first transmit beam, and performs uplink signal transmission with the first UE by using the receive beam, where the first UE is located in the first cell.

The first UE is located in the first cell and second UE is located in the second cell.

According to the processing in steps S101 and S102, the base station transmits a downlink signal to the first UE by using the first transmit beam, and performs uplink signal transmission with the first UE by using the receive beam; and the base station transmits a downlink signal to the second UE by using the second transmit beam, and performs uplink signal transmission with the second UE by using the receive beam.

In this embodiment of the present invention, a method that downlink splitting is performed and uplink splitting is not performed is used to satisfy a downlink capacity requirement, increase uplink coverage, and reduce a difference between the uplink coverage and downlink coverage.

To further reduce interference and increase the uplink coverage, uplink time-frequency resources of the first UE and the second UE may be staggered.

Optionally, the performing uplink signal transmission with the first UE by using the receive beam includes:

S1031: Allocate a first time-frequency resource of the uplink signal to the first UE, where the first time-frequency resource and a second time-frequency resource of an uplink signal of second UE are staggered, where the second UE is located in the second cell.

S1032: Perform uplink signal transmission with the first UE by using the first time-frequency resource and by using the receive beam.

Specifically, the allocating a first time-frequency resource of the uplink signal to the first UE, where the first time-frequency resource and a second time-frequency resource of an uplink signal of second UE are staggered, includes:

acquiring the second time-frequency resource that is used by the second UE in the second cell to transmit the uplink signal; and reserving the second time-frequency resource in a time-frequency resource that is used to transmit an uplink signal in the first cell.

The uplink signal may include an uplink control signal, an uplink data signal, an uplink channel sounding reference signal, a random access signal, or the like, and the following separately describes the foregoing signals in detail.

For an uplink control signal, the uplink control signal is carried by an uplink control channel, and a first time-frequency resource of an uplink control channel of the first UE and a second time-frequency resource of an uplink control channel of the second UE are allocated in a staggered manner.

Specifically:

when allocating a time-frequency resource of a physical uplink control channel (PUCCH) to the first UE, the base station avoids a time-frequency resource, of a PUCCH, allocated to the second UE.

For an uplink data signal, the uplink data signal is carried by an uplink service channel. A first time-frequency resource of an uplink service channel of the first UE and a second time-frequency resource of an uplink service channel of the second UE are allocated in a staggered manner.

Specifically:

when allocating a time-frequency resource of a physical uplink shared channel (PUSCH) to the first UE, the base station avoids a time-frequency resource, of a PUSCH, allocated to the second UE, or when the base station allocates a PUSCH to the first UE, the base station does not allocate the PUSCH of the first UE on a resource the same as a resource of a PUSCH of the second UE.

For an uplink channel sounding reference signal, a first time-frequency resource of an uplink channel sounding reference signal of the first UE and a second time-frequency resource of an uplink channel sounding reference signal of the second UE are allocated in a staggered manner.

Specifically:

when configuring the uplink channel sounding reference signal (SRS), the base station allocates the SRS of the first UE in the first cell in a subframe different from a subframe of the SRS of the second UE in the second cell.

For a random access signal, the random access signal is carried by a random access channel (RACH), and a first time-frequency resource of a RACH of the first UE and a second time-frequency resource of a RACH of the second UE are allocated in a staggered manner.

Specifically:

when configuring the RACH, the base station allocates the RACH of the first UE in the first cell in a subframe different from a subframe of the RACH of the second UE in the second cell.

Optionally, the base station uses the second UE as a virtual user of the first cell, and when allocating an uplink resource of the first cell, the base station not only allocates a resource to the first UE, but also allocates a resource to the virtual user, and after the resource allocation, the base station sets the virtual user to invalid.

In this embodiment of the present invention, by means of staggering time-frequency resources, interference is reduced and uplink coverage is further increased.

Therefore, in the signal processing method provided in this embodiment of the present invention, both a downlink capacity and uplink coverage are increased, thereby improving user experience and reducing user terminal power consumption.

Embodiment 2

Figure 3:
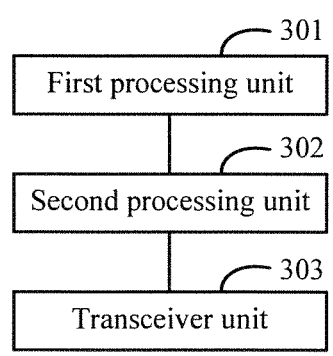
FIG. 3 is a schematic structural diagram of a base station according to Embodiment 2 of the present invention.

FIG. 3 is a schematic structural diagram of a base station provided in this embodiment. As shown in FIG. 3, the base station of the present invention includes a first processing unit 301, a second processing unit 302, and a transceiver unit 303.

The first processing unit 301 is configured to split an array antenna to form a first transmit beam and a second transmit beam in a downlink direction, where the first transmit beam covers a first cell and the second transmit beam covers a second cell.

The base station may perform vertical plane splitting or horizontal plane splitting on the array antenna, which is not limited in this embodiment of the present invention.

As shown in FIG. 2a, the first processing unit 301 splits the array antenna to form two transmit beams in the downlink direction: a transmit beam 0 and a transmit beam 1, where the transmit beam 0 covers a cell 0 and the transmit beam 1 covers a cell 1. Information, such as service channel information, control channel information, broadcast channel information, or synchronization channel information, of each cell may be separately transmitted by using each split transmit beam.

The second processing unit 302 is configured to perform weighting on the array antenna in an uplink direction to form a receive beam.

Compared with the prior art that uplink splitting and downlink splitting are performed simultaneously on an array antenna, in this embodiment of the present invention, the second processing unit 302 does not split the array antenna in the uplink direction, but performs weighting on the array antenna to form the receive beam. That is, for different cells generated by the downlink splitting, a common receive beam is used to perform signal transmission in the uplink direction, as shown in FIG. 2b.

The second processing unit 302 being configured to perform weighting on the array antenna to form a receive beam specifically includes: the second processing unit 302 being configured to perform wide beamforming on the array antenna to form the receive beam; or second processing unit 302 being configured to select some antenna arrays from the array antenna to form the receive beam.

For example, transmission is performed with 8T in an array antenna, in a downlink direction, the first processing unit 301 multiplies four columns of antennas in each polarization direction by a corresponding weighted value to obtain a transmit beam, so that two transmit beams may be formed by using two different weighted values, where each transmit beam corresponds to one cell.

In an uplink direction, if signal receiving is performed with 4R, the second processing unit 302 may perform wide beamforming on the array antenna, that is, map eight physical antennas of the array antenna into four antenna ports, and at the same time, change a beamwidth of the antenna from around 90 degrees to around 65 degrees, so that the beamwidth is the same as a beamwidth of a traditional 4-antenna beam.

The second processing unit 302 performs weighting on the array antenna by means of the wide beamforming, and besides, the second processing unit 302 may also select some antenna arrays from the array antenna. For example, the second processing unit 302 selects four antenna arrays from antenna arrays of the array antenna to perform uplink signal receiving with 4R; and two antenna arrays may be selected if uplink signal receiving is performed with 2R.

The transceiver unit 303 is configured to transmit a downlink signal to first user equipment UE by using the first transmit beam, and perform uplink signal transmission with the first UE by using the receive beam, where the first UE is located in the first cell.

The first UE is located in the first cell and second UE is located in the second cell.

By means of processing of the first processing unit 301 and the second processing unit 302, the transceiver unit 303 transmits a downlink signal to the first UE by using the first transmit beam, and performs uplink signal transmission with the first UE by using the receive beam; and the transceiver unit 303 transmits a downlink signal to the second UE by using the second transmit beam, and performs uplink signal transmission with the second UE by using the receive beam.

In this embodiment of the present invention, a method that downlink splitting is performed and uplink splitting is not performed is used to satisfy a downlink capacity requirement, increase uplink coverage, and reduce a difference between the uplink coverage and downlink coverage.

To further reduce interference and increase the uplink coverage, uplink time-frequency resources of the first UE and the second UE may be staggered.

The base station in this embodiment of the present invention further includes: a third processing unit, configured to allocate a first time-frequency resource of the uplink signal to the first UE, where the first time-frequency resource and a second time-frequency resource of the uplink signal of the second UE are staggered, where the second UE is located in the second cell.

The transceiver unit 303 is configured to transmit the downlink signal to the first user equipment UE by using the first transmit beam, and is configured to perform uplink signal transmission with the first UE by using the first time-frequency resource and by using the receive beam.

Specifically, the third processing unit is configured to acquire the second time-frequency resource that is used by the second UE in the second cell to transmit the uplink signal; and is configured to reserve the second time-frequency resource in a time-frequency resource that is used to transmit an uplink signal in the first cell.

The uplink signal may include an uplink control signal, an uplink data signal, an uplink channel sounding reference signal, a random access signal, or the like. For a specific processing process in which the third processing unit performs staggered allocation on time-frequency resources of the four signals, refer to the description in Embodiment 1, and details are not described herein again.

In this embodiment of the present invention, by means of staggering time-frequency resources, interference is reduced and uplink coverage is further increased.

Therefore, in the base station provided in this embodiment of the present invention, both a downlink capacity and uplink coverage are increased, thereby improving user experience and reducing user terminal power consumption.

Embodiment 3

Figure 4:
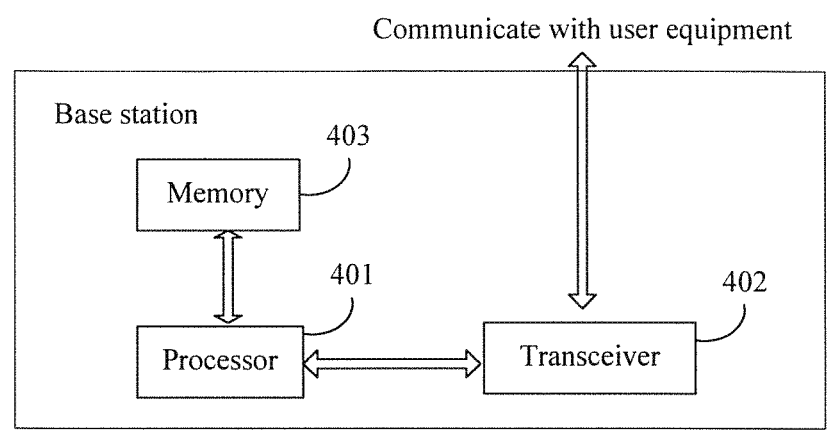
FIG. 4 is a schematic structural composition diagram of a base station according to Embodiment 3 of the present invention.

FIG. 4 is a schematic structural composition diagram of a base station according to this embodiment. As shown in FIG. 4, the base station of the present invention includes: a processor 401, a transceiver 402, and a memory 403.

The processor 401 may be a single-core or multi-core central processing unit (CPU) or an application-specific integrated circuit (ASIC), or one or more integrated circuits configured to implement the embodiments of the present invention.

The transceiver 402 is configured to interact with user equipment. The user equipment includes first user equipment UE, second UE, and the like.

The memory 403 is configured to store a program.

The processor 401 invokes the program stored in the memory 403 to perform the following steps:

splitting an array antenna to form a first transmit beam and a second transmit beam in a downlink direction, where the first transmit beam covers a first cell and the second transmit beam covers a second cell;

performing weighting on the array antenna in an uplink direction to form a receive beam; and transmitting a downlink signal to first user equipment UE by using the first transmit beam, and performing uplink signal transmission with the first UE by using the receive beam, where the first UE is located in the first cell.

Further, the processor 401 being configured to perform weighting on the array antenna to form a receive beam specifically includes: the processor 401 being configured to: perform wide beamforming on the array antenna to form the receive beam; or select some antenna arrays from the array antenna to form the receive beam.

Further, the processor 401 being configured to perform uplink signal transmission with the first UE by using the receive beam specifically includes:

the processor 401 being configured to allocate a first time-frequency resource of the uplink signal to the first UE, where the first time-frequency resource and a second time-frequency resource of an uplink signal of second UE are staggered, where the second UE is located in the second cell; and being configured to perform uplink signal transmission with the first UE by using the first time-frequency resource and by using the receive beam.

Further, the processor 401 being configured to allocate a first time-frequency resource of the uplink signal to the first UE, where the first time-frequency resource and a second time-frequency resource of an uplink signal of second UE are staggered specifically includes:

the processor 401 being configured to: acquire the second time-frequency resource that is used by the second UE in the second cell to transmit the uplink signal; and reserve the second time-frequency resource in a time-frequency resource that is used to transmit an uplink signal in the first cell.

Further, the uplink signal includes: an uplink control signal, an uplink data service, an uplink channel sounding signal, and a random access signal.

Specifically, the base station also performs the signal processing method in Embodiment 1 according to instructions, and details are not described herein again.

In the signal processing method and the base station provided in the present invention, signal transmission is performed in a manner in which downlink splitting is performed and uplink splitting is not performed, so that in a case in which a downlink capacity remains unchanged, uplink coverage is significantly increased, and a downlink capacity requirement and an uplink coverage requirement are satisfied. In addition, a wireless resource management algorithm is improved and a manner of staggering time domain resources or frequency domain resources is used, so that interference is reduced and beam interference between cells is reduced, thereby significantly improving service experience of a user using mobile broadband, and significantly reducing user terminal power consumption.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A signal processing method, comprising: splitting, by a base station, an array antenna to form a first transmit beam and a second transmit beam in a downlink direction, wherein the first transmit beam covers a first cell and the second transmit beam covers a second cell;
    performing, by the base station, weighting on the array antenna in an uplink direction to form a receive beam;
    allocating a first time-frequency resource of an uplink signal to a first user equipment (UE) and allocating a second time-frequency resource of the uplink signal, wherein the first UE is located in the first cell and a second UE is located in the second cell, by:
        when allocating a time-frequency resource of a physical uplink shared channel (PUSCH), allocating the first time-frequency resource of an uplink signal to the first user equipment (UE) on a resource that is not the same as a resource of a PUSCH as the second time-frequency resource of the uplink signal that is allocated to the second UE,
        when configuring an uplink channel sounding reference signal (SRS), allocating the first time-frequency resource of an uplink signal to the first user equipment (UE) in a subframe of the SRS that is not the same as a subframe of the SRS in which second time-frequency resource of the uplink signal is allocated to the second UE, or
    when configuring by a random access channel (RACH), allocating a time-frequency resource of the RACH to the first user equipment (UE) in a subframe that is not the same as a subframe in which second time-frequency resource of the RACH is allocated to the second UE;
    transmitting, by the base station, a downlink signal to the first UE by using the first transmit beam, and performing uplink signal transmission with the first UE by using the receive beam; using the second UE as a virtual user of the first cell; and when allocating an uplink resource of the first cell, also allocating a resource to the virtual user of the first cell, and thereafter setting the virtual user to invalid.

2. The method according to claim 1, wherein performing, by the base station, weighting on the array antenna to form the receive beam comprises: performing wide beamforming on the array antenna to form the receive beam.

3. The method according to claim 1, wherein performing, by the base station, weighting on the array antenna to form the receive beam comprises:
    selecting some antenna arrays from the array antenna to form the receive beam.

4. The method according to claim 1, wherein performing uplink signal transmission with the first UE by using the receive beam comprises:
    performing uplink signal transmission with the first UE by using the first time-frequency resource and by using the receive beam.

5. The method according to claim 1, wherein the uplink signal comprises any one or any combination of the following: an uplink control signal, an uplink data service, an uplink channel sounding signal, or a random access signal.

6. A base station, comprising:
    a transceiver configured to interact with user equipment;
    memory configured to store a program; and
    a processor configured to invoke the program stored in the memory, to perform the following:
    splitting an array antenna to form a first transmit beam and a second transmit beam in a downlink direction, wherein the first transmit beam covers a first cell and the second transmit beam covers a second cell,
    performing weighting on the array antenna in an uplink direction to form a receive beam,
    allocating a first time-frequency resource of an uplink signal to a first user equipment (UE) and allocating a second time-frequency resource of the uplink signal, wherein the first UE is located in the first cell and a second UE is located in the second cell, by:
    when allocating a time-frequency resource of a physical uplink shared channel (PUSCH), allocating the first time-frequency resource of an uplink signal to the first user equipment (UE) on a resource that is not the same as a resource of a PUSCH as the second time-frequency resource of the uplink signal that is allocated to the second UE;
    when configuring an uplink channel sounding reference signal (SRS), allocating the first time-frequency resource of an uplink signal to the first user equipment (UE) in a subframe of the SRS that is not the same as a subframe of the SRS in which second time-frequency resource of the uplink signal is allocated to the second UE; or when configuring by a random access channel (RACH), allocating a time-frequency resource of the RACH to the first user equipment (UE) in a subframe that is not the same as a subframe in which second time-frequency resource of the RACH is allocated to the second UE, and transmitting a downlink signal to the first UE by using the first transmit beam, and performing uplink signal transmission with the first UE by using the receive beam, wherein the first UE is located in the first cell;

using the second UE as a virtual user of the first cell; and when allocating an uplink resource of the first cell, also allocating a resource to the virtual user of the first cell, and thereafter setting the virtual user to invalid.

7. The base station according to claim 6, wherein the processor is configured to: perform wide beamforming on the array antenna to form the receive beam.

8. The base station according to claim 6, wherein the processor is configured to: select some antenna arrays from the array antenna to form the receive beam.

9. The base station according to claim 6, wherein the processor is configured to: perform uplink signal transmission with the first UE by using the first time-frequency resource and by using the receive beam.

10. The base station according to claim 6, wherein the uplink signal comprises any one or any combination of the following: an uplink control signal, an uplink data service, an uplink channel sounding signal, or a random access signal.

* * * * *